United States Patent [19]
Radford et al.

[11] Patent Number: 5,457,598
[45] Date of Patent: Oct. 10, 1995

[54] HIGH CAPACITANCE THIN FILM CAPACITOR

[76] Inventors: Kenneth C. Radford, 710 Robbiins Station Rd., North Huntingdon, Pa. 15642; Stephen R. Gurkovich, 2605 Orlando Pl., Pittsburgh, Pa. 15235; Andrew J. Piloto, 9491 Clocktower La., Columbia, Md. 21046; Deborah P. Partlow, 3008 Bryer Ridge Dr., Export, Pa. 15632

[21] Appl. No.: 225,114

[22] Filed: Apr. 8, 1994

[51] Int. Cl.$^6$ .............................. H01G 4/012; H01G 4/12
[52] U.S. Cl. .................... 361/321.2; 361/321.3; 361/323; 361/305; 427/226
[58] Field of Search .............. 361/321.2, 306.2, 361/321.3, 322, 321.4, 303, 304, 305, 323, 273; 427/79, 226, 126.3

[56] References Cited

U.S. PATENT DOCUMENTS

| | | | |
|---|---|---|---|
| 3,549,415 | 12/1970 | Capek | 361/321 |
| 4,535,026 | 8/1985 | Yoldas et al. | 428/310.5 |
| 4,868,711 | 9/1989 | Hirama | 361/321 |
| 4,989,117 | 1/1991 | Hernandez | 361/306 |
| 5,034,850 | 6/1991 | Hernandez | 361/306.2 |
| 5,138,520 | 8/1992 | McMillan et al. | 361/311 |
| 5,198,269 | 3/1993 | Swartz | 427/226 |
| 5,206,788 | 4/1993 | Larson | 361/313 |

OTHER PUBLICATIONS

"Deposition and properties of optical oxide coatings from polymerized solutions" by B. E. Yoldas, Applied Optics, vol. 21, No. 16, 15 Aug., 1982 pp. 2960–2963.

"Thirty—seven layer optical filter from polymerized solgel solutions" by Deborah P. Parlow and Terry W. O'Keeffe, Applied Optics, vol. 29, No. 10, 1 Apr. 1990, pp. 1526–1529.

Primary Examiner—Leo P. Picard
Assistant Examiner—Michael D. Switzer

[57] ABSTRACT

A multi-layer capacitor comprising a stack of sheet electrodes with an insulating dielectric layer sandwiched between these layers is disclosed. The dielectric layer formed on the electrode is prepared by the "sol-gel" process.

8 Claims, 3 Drawing Sheets

HIGH CAPACITANCE THIN FILM CAPACITOR

FIELD OF THE INVENTION

This invention relates to a multi-layer capacitor comprising a stack of thin film capacitors which delivers very high capacitance, e.g. several tens of microfaradas. The capacitor is useful, for example, in multimegahertz filtering.

The present invention also includes within its scope the method of obtaining such a capacitor exhibiting high capacitive density. More particularly, the present invention relates to the design and construction of a multi-layer capacitor incorporating dielectric layers prepared by a sol-gel process.

BACKGROUND OF THE INVENTION

A multi-layer capacitor is utilized where a large amount of capacitance, for example, in an integrated circuit is needed. For example, low equivalent series resistance (ESR) capacitors are an essential component in MMW T/R modules for both energy storage and noise filtering. To achieve a high packaging density, the ideal capacitor should be made low profile and be integrated into the substrate of the circuit. For achieving a large capacitance with a capacitor, it is desirable that the capacitor has a large footprint, i.e, area occupied on the substrate. For example, for capacitance of 50 µF, a footprint of 1.5 inches×1.5 inches may be necessary. Traditional capacitor comprises, for example, a multilayer ceramic of barium titanate or a tantalum solid electrolyte capacitor do not always provide the required capacitance per unit volume. Such capacitors usually exhibit relatively high equivalent series inductance and a low self-resonant frequency, e.g. less than 500 KHz for 50 µF.

DESCRIPTION OF PRIOR ART

U.S. Pat. No. 4,989,117 discloses a thin decoupling capacitor which is comprised of a ceramic or ceramic like substrate having printed thereon conductive layers, dielectric layers such as glass/ceramic dielectric paste or dielectric sol-gel and protective layers. Mounted on this thin capacitor is an integrated circuit chip. The resulting assembly is attached to the IC frame.

U.S. Pat. No. 5,034,850 describes a decoupling capacitor comprised of a ceramic substrate having printed thereon a capacitance layer which is made by thick or thin film processes. According to the specification, this capacitor is made by sequentially depositing metal electrode and ceramic dielectric films using thick film pastes or by spin coatings. This process is limited in the number of layers and hence capacitance that can be made. Such a process also requires a substrate such as alumina or aluminum nitride as a substrate for the deposition of the coatings. U.S. Pat. No. 5,138,520 discloses methods and apparatus for depositing thin films of complex materials using the so called photo/plasma-enhanced chemical vapor deposition methods (CVD).

Finally, there is the process known in the art as "tape technology". In this process, ceramic tapes are screen printed with electrodes. A stack of the resulting product is then laminated together prior to sintering to provide the desired capacitor.

SUMMARY OF THE INVENTION

According to the present invention, there is provided a high energy (capacitance) multi-layer capacitor comprising a stack of thin films which provide a large capacitance and exhibit a relatively high self-resonant frequency but have a relatively low equivalent series resistance (ESR) and a relatively low equivalent series inductance (ESL). Such a capacitor is readily amenable to substrate integration. Broadly speaking, the thin films utilized in the capacitor according to the present invention are prepared by the "sol-gel" method. Using such methods, defect-free films are produced and when high dielectric constant oxide ceramic materials are used, high capacitance/unit volume is achieved. The resulting capacitor design allows proof-testing prior to final capacitor assembly. The method is further amenable to complete control of capacitance and temperature stability such that the desired end properties can be tailored.

BRIEF DESCRIPTION OF FIGURES

The invention may best be understood by reference to the following detailed description taken in connection with the accompanied drawings.

As used hereinafter and in the claims, the terms ESR denotes equivalent series resistance and PMN denotes lead magnesium niobate. Also, PT denotes lead titanate; PFN denotes lead iron niobate; PFW denotes lead iron tungstate; PMnN denotes Lead Manganese Niobate; K denotes dielectric constant; and PZN denotes lead zinc niobate.

DETAILED DESCRIPTION OF THE INVENTION

Figure 1:
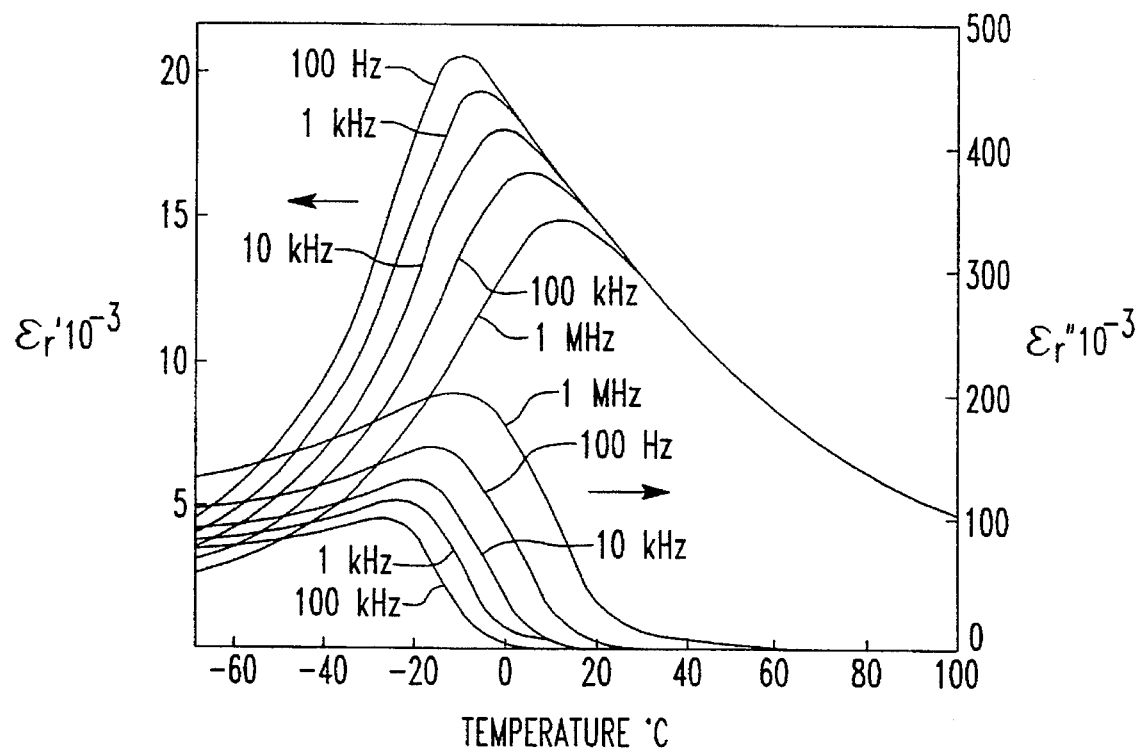
FIG. 1 illustrates the dielectric constant and the loss tangent of both PMN for various frequencies over a broad temperature range.
Figure 4:
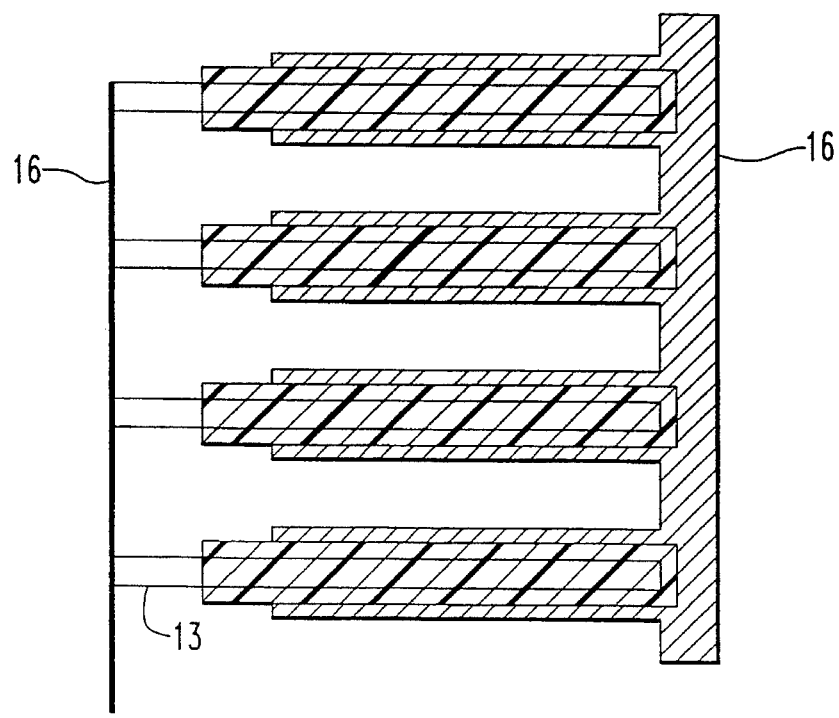
FIG. 4 is a side view of the capacitor as described in FIG. 2.
Figure 2:
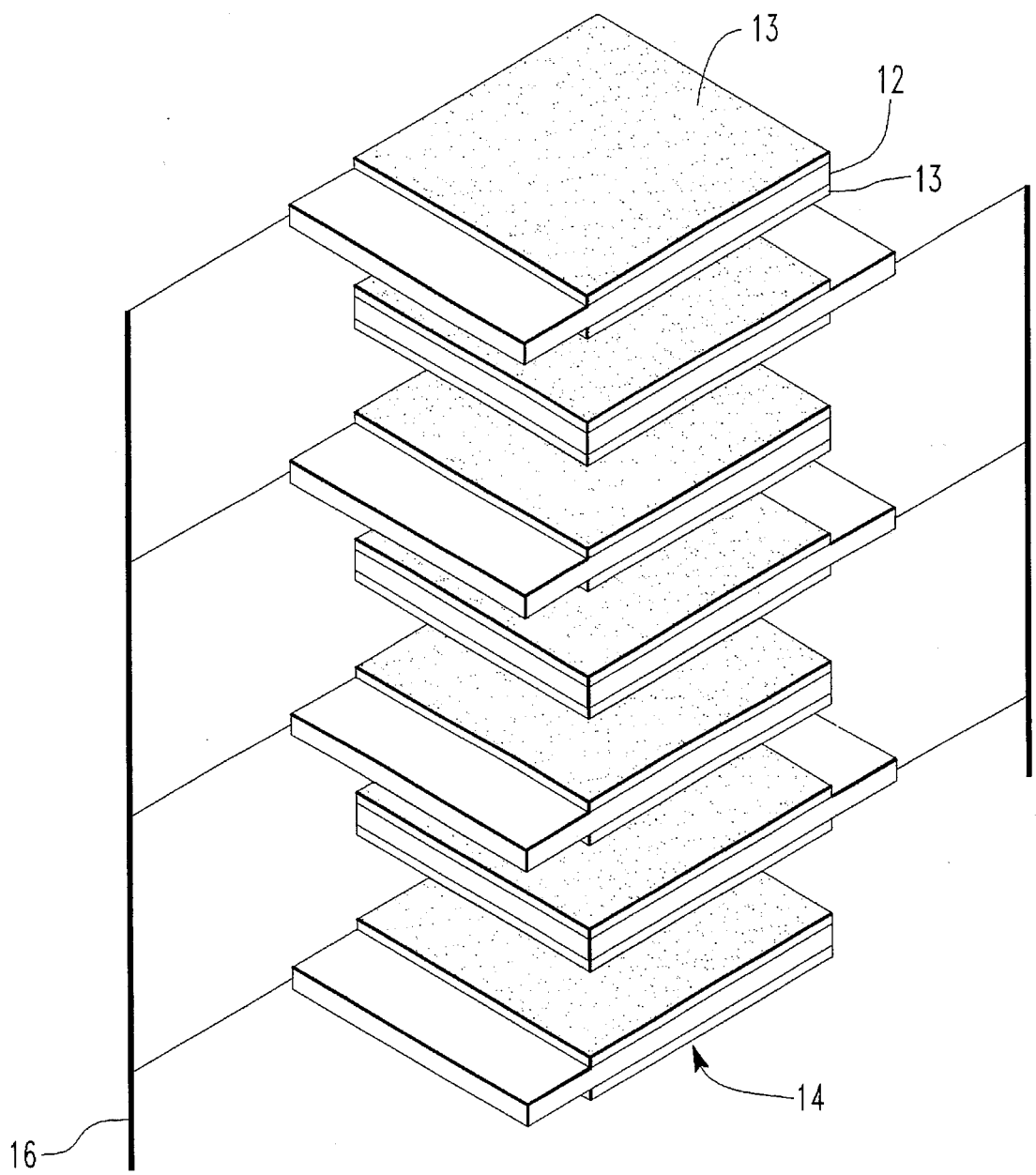
FIG. 2 illustrates the capacitor according to present invention.

Referring now to FIG. 2, there is provided a multi-layer capacitor, indicated by the general reference (14), which comprises a stack of electrically conductive electrodes (12) with an insulating, dielectric layer (13) sandwiched between each of the said conductive electrodes (12). By alternating the electrode terminations, a stacked parallel plate capacitor (14) is produced. The individual electrodes (12) are electrically connected, via connectors (16). The connections are made using standard procedures used in ceramic capacitor fabrication. As an example, the opposing electrode layers in a finished stack of capacitive element's are soldered together along with the leads for connecting the final capacitor to the remainder of the electrical circuit and the entire stack is then encapsulated in a suitable polymer such as polyurethane.

In a typical process for producing the capacitor, the metal electrode (12) is immersed into a PMN solution to provide the dielectric film (13) of approximately 1,500 Angstroms on the exposed surfaces of the electrode (12). A plurality of electrodes (12) so prepared are arranged in parallel with one another thereby creating a stack to form the capacitor (14). The capacitor (14) is then encapsulated in a suitable insulating material e.g. a polymer not shown. Finally, electrically conductive connections (16) are made to individual electrodes (12) in the stack of the capacitor (14) as shown in FIG. 2.

The metal electrode (12) can be made of any electrically conductive metal which has a suitable melting point and which is non-reactive with the coating film (13). Among the above mentioned metals, silver and gold are preferred, as these materials tend to minimize Equivalent Series Resistance (ESR). An electrode (12) thickness of about 0.002 to about 0.004 inches (about 50–100μ) is preferred as such thickness provides sufficient rigidity for supporting the film (13) and the processing thereof.

As practiced in the present invention, the dielectric film (13) formed on electrode (12) is prepared by the "sol-gel" thin film process. This process starts with any solution, such as a metal salt, or other metallorganic containing a metal or mixture of metal atoms, which can be made to form an impervious, defect-free coating on a metal electrode can be used as the precursor to ceramic oxide capacitor dielectric layer. In a preferred embodiment, the sol-gel thin film process begins with an alkoxide starting material, e.g. sodium or potassium alkoxide, diluted in alcohol and partially hydrolyzed with the addition of a limited amount of water. Final film thickness is controlled by the liquid concentration and by the withdrawal rate of the electrode from the solution. The film dries immediately, thus forming the "gel" state. An air treatment at temperatures greater than 350° C. is used to drive off the organics and convert the film (13) to the desired ceramic crystal structure. Please see U.S. Pat. No. 4,535,026, Applied Optics, Vol 21 Page 2960 and Applied Optics Vol. 29., No. 10 Page 1527. These disclosures are incorporated herein by reference.

The film (13) prepared by the sol-gel process described above preferably is made from materials having a high dielectric constant such as lead magnesium niobate (PMN), however, other suitable oxides having a high dielectric constant may be used as well. In particular, any dielectric material which may be processed as a solution, i.e., by the sol-gel process, is amenable to produce such a film (13). For high energy capacitors, materials exhibiting a high dielectric constant are preferred to minimize the overall size of the capacitor (14). Other examples of such compositions in the ceramic systems comprising: Lead Iron Niobate-Lead Iron Tungstate (PFN-PFW), Lead Magnesium Niobate-Lead Titanate-Lead Managanese Niobate (PMN-PT-PMnN), Lead Magnesium Niobate-Lead Iron Tungstate-Lead Titanate(PMN-PFW-PT), Lead Zinc Niobate-Lead Magnesium Niobate-Lead Iron Tungstate (PZN-PNN-PFW), and mixtures of the above. This list is stated to be illustrative of the materials useful herein. It is by no means exhaustive.

Since the dielectric constant of materials such as PMN is very temperature sensitive, the addition of modifiers to the PMN may be indicted to permit the capacitor to be temperature compensated. The present invention includes the addition of materials such as $PbTiO_3$ to the PMN which is used to form a modified, $PbTiO_3$-PMN Film (13). The incorporation of such a modified PMN film (13) into the finished capacitor (14) provides for temperature compensation in that the dielectric constant of the PMN film (13) decreases while that of the $PbTiO_3$-PMN film (13) increases. The overall effect is a parallel plate configuration in which the thermal changes are mitigated giving a reasonably constant capacitance over a broader temperature range than is possible using only one of the compositions. Since any of the individual films (13) in the capacitor (14) can easily be made with any desirable composition prior to final stacking, a capacitor with particular capacitance and thermal behavior may be produced. Conceivably, each layer (13) within the capacitor (14) could be made from a different composition.

Figure 3:
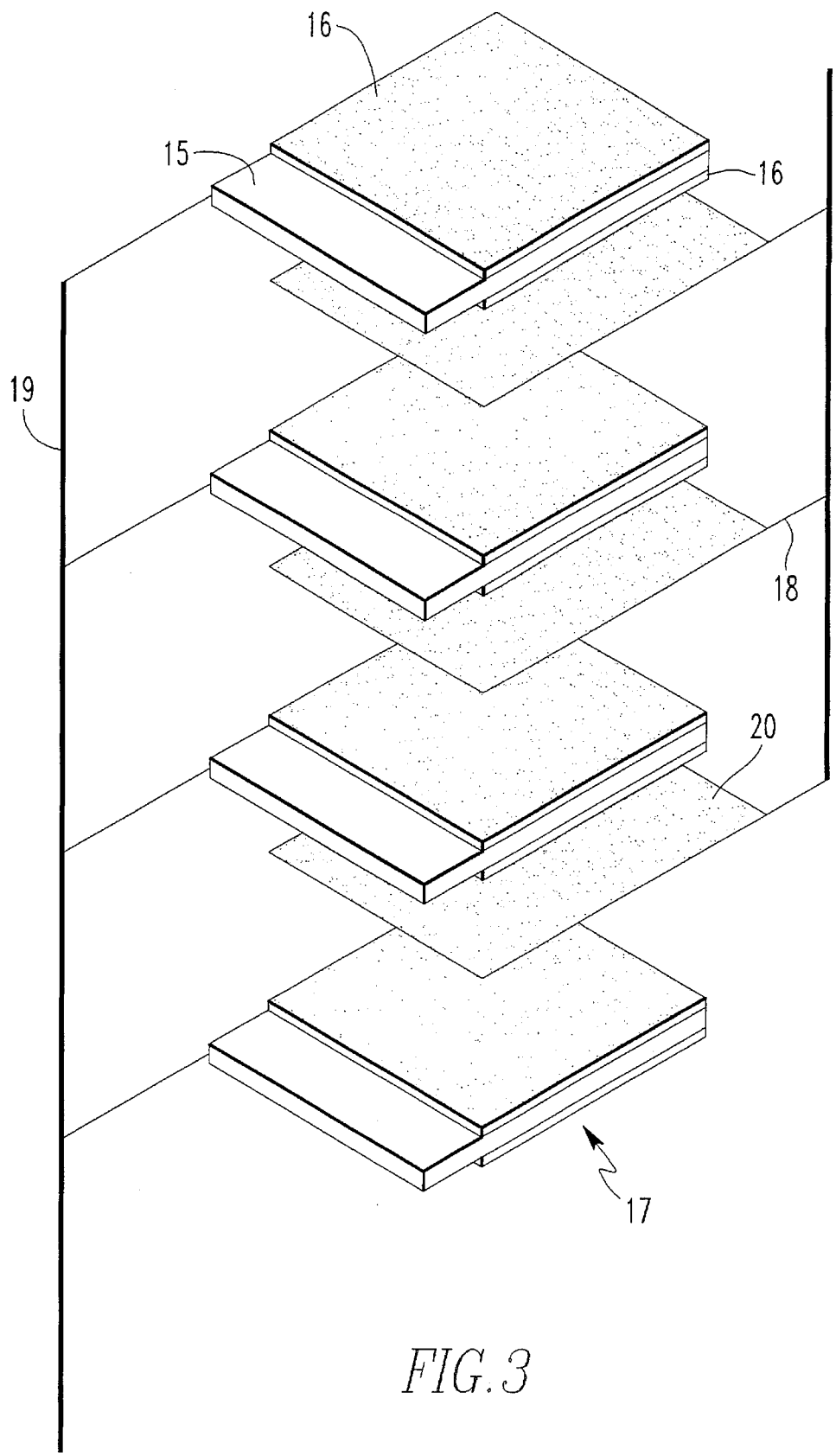
FIG. 3 illustrates an alternate embodiment of the present invention showing a thin film capacitor with clearing electrodes.

Referring to FIG. 3, an alternative embodiment of the present invention is shown. In the alternative embodiment, a metal electrode (15) is immersed into a PMN solution to provide a film (16) of approximately 3000 Angstroms on the exposed surfaces of the electrode (15). However, unlike the embodiment described previously, in the alternative embodiment a plurality of electrodes so prepared are arranged in parallel and alternating with metalized polymer film electrodes (20) thereby creating a stack (17). The PMN film electrodes (15) are electrically connected via a common termination (18). Likewise, the metal electrodes (15) are electrically connected via a common termination (19). The stack (17) is then encapsulated in a suitable polymer, not shown.

The metalized polymer film electrode (20) is prepared by coating a polymer film approximately 3 microns thick with a metal such as aluminum, approximately 200–500 angstroms thick. Such a thin layer of polymer will not significantly increase the capacitor thickness. This alternative embodiment of the invention demonstrates a significant improvement afforded by the present invention not shown nor suggested by the prior art, namely, the ability to proof test the capacitor components during fabrication. After the stack (17) of the alternative embodiment is made, pulsed voltages in excess of the design voltages are applied to the common terminations (18 and 19). If a defect causes dielectric breakdown, the aluminum is vaporized away from the location of the defect, and the resulting short is "cleared". The resulting stacked, multi-layer capacitor (14) can then be operated at the design voltages with very high confidence. Since the electrode material has been removed from the defect area, no voltage is applied across the defect. This proof testing, coupled with the sol-gel fabrication technique described previously, produces capacitors exhibiting very high packaging densities and very high reliability neither shown nor suggested by the prior art.

In another embodiment, a capacitor is prepared by having a thin surface coating of an electrode material preferably metal on the capacitive layer. Such an electrode may be made by conventional sputtering or evaporation or other method to produce an electrode coating thickness of 100–800 Angstroms, but preferably 200–400 Angstroms. Metals must be electrically conductive, such as gold, silver, copper, but preferably aluminum.

This electrode is then subjected to a high voltage pulse −100–2000 V for 1–100 microseconds in order to "clear" any location of the ceramic that contains defects. The thin metal electrode is thereby evaporated off the ceramic around the defect. The process is called preclearing and allows each sheet electrode to be pre-tested prior to stacking thus increasing the reliability of the final multi-layer capacitor.

In order to further illustrate the practice of this invention, the following Example is included.

EXAMPLE

A thin titanium dioxide film is prepared on a conductive electrode substrate as follows: The sol-gel precursor solution is prepared by mixing 868 grams of dry ethyl alcohol, 18 grams of water, and 114 grams of titanium ethoxide in a sealed container. The mixture is allowed sufficient time to fully react; 12 hours at room temperature is sufficient. A few drops of the liquid are then applied to a clean, dry metal substrate using an eyedropper, and the excess liquid is removed by spinning the subtrate at 2000 rpm. Equipment such as is used in the processing of photoresist for semiconductor devices is used for the spinning process. The film is allowed to dry under ambient conditions for about 10 minutes. The coated substrate is then heated in air 400° C. for 10 minutes. This produces a thin film capacitor coating (thickness about 500 angstroms) on a metal electrode substrate.

The foregoing merely illustrates the principles of the invention and it will thus be appreciated that those skilled in the art will be able to devise numerous alternative arrangements which, although not explicitly described herein, embody the principles of the invention and are within its spirit and scope.

We claim:

1. A multi-layer capacitor comprising:

a first stack of sheet electrodes having a thin dielectric film sandwiched between each of its surfaces, wherein said electrodes are arranged alternatively, said dielectric film being deposited by a sol-gel process;

a second stack of sheet electrodes, each comprised of a metallized polymer film, said second stack of electrodes being positioned between alternate ones of the electrodes of said first stack of electrodes;

means for electrically connecting the electrodes of said first stack of electrodes; and means for electrically connecting the electrodes of said second stack of electrodes.

2. A capacitor according to claim 1, in which said dielectric film comprises lead magnesium niobate.

3. A capacitor according to claim 2, in which said dielectric film has a thickness of about 1500–3000 Angstroms.

4. A capacitor according to claim 1 which is encapsulated in a polymer.

5. A capacitor according to claim 1 in which said thin film is deposited on said electrode by a process which comprises:

(a) preparing a solution of alkoxide in alcohol in the presence of a small amount of water;

(b) allowing the reaction to completion;

(c) applying a sufficient amount of the resultant solution on to said electrode to form a thin film thereon; and (d) drying the film.

6. A capacitor according to claim 1 in which said electrode comprises silver or gold.

7. A capacitor according to claim 6 in which said silver or gold electrode has a thickness of about 50–100 μ.

8. A capacitor according to claim 2 in which said PMN comprises a small amount of $PbTiO_3$.

* * * * *